(12) United States Patent
Goto et al.

(10) Patent No.: US 9,725,786 B2
(45) Date of Patent: *Aug. 8, 2017

(54) NICKEL EXTRACTION METHOD

(71) Applicants: Kyushu University, National University Corporation, Fukuoka-shi, Fukuoka (JP); SUMITOMO METAL MINING CO., LTD., Tokyo (JP)

(72) Inventors: Masahiro Goto, Fukuoka (JP); Fukiko Kubota, Fukuoka (JP); Yuzo Baba, Fukuoka (JP)

(73) Assignees: Kyushu University, National University Corporation, Fukuoka-shi (JP); SUMITOMO METAL MINING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/650,364

(22) PCT Filed: Sep. 6, 2013

(86) PCT No.: PCT/JP2013/074158
§ 371 (c)(1),
(2) Date: Jun. 8, 2015

(87) PCT Pub. No.: WO2014/091805
PCT Pub. Date: Jun. 19, 2014

(65) Prior Publication Data
US 2015/0315674 A1 Nov. 5, 2015

(30) Foreign Application Priority Data
Dec. 12, 2012 (JP) ................................ 2012-271572

(51) Int. Cl.
| | | |
|---|---|---|
| C22B 23/00 | (2006.01) |
| C22B 3/00 | (2006.01) |
| C22B 3/44 | (2006.01) |
| H01M 10/54 | (2006.01) |
| B01D 11/04 | (2006.01) |
| C22B 3/26 | (2006.01) |
| C22B 7/00 | (2006.01) |

(52) U.S. Cl.
CPC ...... *C22B 23/0484* (2013.01); *B01D 11/0492* (2013.01); *C22B 3/0005* (2013.01); *C22B 3/44* (2013.01); *C22B 7/006* (2013.01); *C22B 23/0453* (2013.01); *C22B 23/0461* (2013.01); *H01M 10/54* (2013.01); *Y02P 10/234* (2015.11); *Y02W 30/84* (2015.05)

(58) Field of Classification Search
CPC ..... C22B 3/0005; C22B 3/44; C22B 23/0461; C22B 7/007; H01M 10/54; B01D 11/0492; B01D 11/04
USPC ...................................................... 423/139
See application file for complete search history.

(56) References Cited

U.S. PATENT DOCUMENTS

| | | | |
|---|---|---|---|
| 5,250,517 A | 10/1993 | Branca et al. |
| 6,267,936 B1 | 7/2001 | Delmas et al. |
| 6,709,641 B1 | 3/2004 | Gutknecht et al. |
| 8,951,486 B2 * | 2/2015 | Goto et al. ................. 423/21.5 |
| 9,011,804 B2 * | 4/2015 | Goto et al. ................. 423/150.1 |
| 9,458,526 B2 * | 10/2016 | Goto ...................... C22B 59/00 |
| 2005/0124765 A1 | 6/2005 | Seko et al. |
| 2007/0248514 A1 | 10/2007 | Cheng et al. |
| 2013/0102806 A1 | 4/2013 | Sakaki et al. |
| 2014/0234187 A1 | 8/2014 | Goto et al. |
| 2014/0328737 A1 | 11/2014 | Goto et al. |
| 2015/0315674 A1 | 11/2015 | Goto et al. |

FOREIGN PATENT DOCUMENTS

| | | |
|---|---|---|
| AU | 725800 B2 | 10/2000 |
| CN | 101519427 A | 9/2009 |
| CN | 103582711 A | 2/2014 |
| CN | 104822851 A | 8/2015 |
| EP | 0834581 A1 | 4/1998 |
| EP | 2679693 A1 | 1/2014 |
| EP | 2682486 A1 | 1/2014 |
| EP | 2712940 A1 | 4/2014 |
| JP | H04-074711 A | 3/1992 |
| JP | H06-200336 A | 7/1994 |
| JP | H09-143589 A | 6/1997 |

(Continued)

OTHER PUBLICATIONS

International Search Report of PCT/JP2013/074158 dated Nov. 26, 2013.
K. Shimojo, H. Naganawa, J. Noro, F. Kubota and M. Goto; Extraction Behavior and Separation of Lanthanides With a Diglycol Amic Acid Derivative and a Nitrogen-Donor Ligand; Anal. Sci., 23, 1427-30, Dec. 2007.
Hirofumi Morizono et al., Liquid-liquid Extraction of Transition Metal Ions With an Alkylhistidine Extractant, Separation and Purification Technology, Jul. 9, 2011, vol. 80, No. 2, p. 390-395.
C. Bourget et al., "Cyanex® 301 binary extractant systems in cobalt/nickel recovery from acidic sulphate solutions," Hydrometallurgy, vol. 77, No. 3-4, Jun. 1, 2005, pp. 203-218.
J. M. Zhao et al., "Synergistic extraction and separation of valuable metals from waste cathodic material of lithium ion batteries using Cyanex272 and PC-88A", Separation and Purification Technology, vol. 78, No. 3, Apr. 1, 2011, pp. 345-351.

(Continued)

*Primary Examiner* — Steven Bos
(74) *Attorney, Agent, or Firm* — Locke Lord LLP; James E. Armstrong, IV; Nicholas J. DiCeglie, Jr.

(57) ABSTRACT

In the present invention, nickel is selectively extracted from an acidic solution that contains a high concentration of manganese. This valuable metal extraction agent is represented by the general formula. In the formula, $R^1$ and $R^2$ are alkyl groups that may be the same or different, $R^3$ is a hydrogen atom or an alkyl group, and $R^4$ is a hydrogen atom or any group, other than an amino group, bonded to an α carbon atom of an amino acid. The general formula preferably has a glycine unit, a histidine unit, a lysine unit, an aspartic acid unit or a n-methylglycine unit. When extracting nickel by using this extraction agent, it is preferable to adjust the pH of the acidic solution to 2.3 to 5.5 inclusive.

4 Claims, 4 Drawing Sheets

(56) References Cited

FOREIGN PATENT DOCUMENTS

| | | |
|---|---|---|
| JP | H09-291320 A | 11/1997 |
| JP | 2000-212658 A | 8/2000 |
| JP | 2000-234130 A | 8/2000 |
| JP | 2000-313928 A | 11/2000 |
| JP | 2002-539324 A | 11/2002 |
| JP | 2007327085 A | 12/2007 |
| JP | 2009-256291 A | 11/2009 |
| JP | 2010-174366 A | 8/2010 |
| JP | 2012-102062 A | 5/2012 |
| JP | 2013-216656 A | 10/2013 |
| WO | WO-2005/073415 A1 | 8/2005 |
| WO | 2012/005183 A1 | 1/2012 |
| WO | 2013/069562 A1 | 5/2013 |
| WO | 2013/069563 A1 | 5/2013 |
| WO | 2013/136941 A1 | 9/2013 |
| WO | 2014/148431 A1 | 9/2014 |

OTHER PUBLICATIONS

Extended European Search Report dated Nov. 20, 2015, issued for European Patent Application No. 13862883.9.
International Search Report for International Application No. PCT/JP2013/062481 dated Jul. 9, 2013.
International Search Report for International Application No. PCT/JP2012/078445 dated Jan. 29, 2013.
International Search Report for International Application No. PCT/JP2012/078446 dated Jan. 29, 2013.
International Search Report for International Application No. PCT/JP2013/054419 dated May 28, 2013.
International Search Report for International Application No. PCT/JP2014/057133 dated Apr. 22, 2014.
Robert Pajewski, "The effect of midpolar regime mimics on anion transport mediated by amphiphilic heptapeptides", New Journal of Chemistry, 2007, 31, pp. 1960-1972.
Office Action for Chinese Patent Application No. 201380042793.7 dated Nov. 23, 2015.
Office Action for Japanese Application No. 2013-084951 dated Jan. 14, 2014.
CAS Registration No. 1156229-80-9.
Extended European search report for European Application No. 12848105.8 dated Jan. 22, 2014.
Naganawa H et al: "A New Green Extractant of the Diglycol Amic Acid Type for Lanthanides", Solvent Extraction Research and Development, Japan, Japanese Association of Solvent Extraction, SAGA, JP, vol. 14, Jan. 1, 2007 (Jan. 1, 2007), pp. 151-159, XP002597763.
Singh D K et al: "Extraction of rare earths and yttrium with high molecular weight carboxylic acids", Hydrometallurgy, Elsevier Scientific Publishing Cy. Amsterdam, NL, vol. 81, No. 3-4, Mar. 1, 2006 (Mar. 1, 2006), pp. 174-181, XP027884077.
Extended European search report for European Application No. 12847107.5 dated Feb. 6, 2014.
Holger Stephan et al: "Liquid-Liquid Extraction of Metal Ions With Amido Podands", Solvent Extraction and Ion Exchange, Taylor & Francis Group LLC, US, vol. 9, No. 3, Jan. 1, 1991 (Jan. 1, 1991), pp. 459-469, XP008157386.
Office Action for Japanese Application No. 2014-022868 dated Apr. 8, 2014.
CAS Registration No. 1153237-54-7.
CAS Registration No. 1153399-39-3.
CAS Registration No. 1178468-85-3.
CAS Registration No. 1179174-30-1.
CAS Registration No. 1182789-10-1.
CAS Registration No. 1183588-00-2.
CAS Registration No. 1291231-35-0.
Extended European search report for European Application No. 13761717.1 dated Oct. 14, 2014.
Yuzo Baba et al: "Development of Novel Extractants with Amino Acid Structure for Efficient Separation of Nickel and Cobalt from Manganese Ions", Industrial & Engineering Chemistry Research, vol. 53, No. 2, Dec. 25, 2013 (Dec. 25, 2013), pp. 812-818, XP55142933.
Smith B F et al: "Amides as phase modifiers for N,N'-tetraalkylmalonamide extraction of actinides and lanthanides from nitric acid solutions", Separation Science and Technology, Dekker, New York, NY, US, vol. 32, Jan. 1, 1997 (Jan. 1, 1997), pp. 149-173, XP009180393.
Office Action for U.S. Appl. No. 14/130,283 dated Feb. 26, 2015.
Office Action for Chinese Application No. 201380002904.1 dated Jun. 26, 2015.
Office Action for Chinese Application No. 201480008628.4 dated Mar. 10, 2016.
Extended European search report for European Application No. 14770382.1 dated Feb. 16, 2016.
Kunitake, et al., "Regulation of catalytic . . . membranes", Studies in Organic Chemistry, 1983, 13 (Biomimetic Chem.), pp. 147-162.
Office Action for U.S. Appl. No. 14/423,061 dated Mar. 13, 2017.

* cited by examiner

NICKEL EXTRACTION METHOD

CROSS-REFERENCE TO RELATED APPLICATIONS

This application is the national phase under 35 U.S.C. §371 of PCT International Application No. PCT/JP2013/074158, filed Sep. 6, 2013, which claims the benefit of Japanese Application No. 2012-271572, filed Dec. 12, 2012, the entire contents of the aforementioned applications are hereby incorporated herein by reference.

TECHNICAL FIELD

The present invention relates to a nickel extraction method.

BACKGROUND ART

Nickel, cobalt and rare earth metals are known as valuable metals and used for various applications in industry. Nickel and cobalt is used for positive electrode materials for secondary batteries and the like. Rare earth metals are used for fluorescent materials, negative electrode materials for nickel-hydrogen batteries, additives for magnets installed in motors, abrasives for glass substrates used for liquid crystal display panels and hard disk drives, and the like.

In recent years, energy savings have been strongly promoted, and in the automobile industry conventional gasoline-engined cars are being rapidly replaced by hybrid cars and electric cars equipped with secondary, batteries using nickel, cobalt and rare earth metals. In lighting equipment, conventional fluorescent lamps are being rapidly replaced by efficient three band fluorescent lamps using rare earth metals such as lanthan, cerium, yttrium, terbium and europium. The above cobalt, nickel and rare earth metals are scarce resources, and most of them depend on imports.

Yttrium and europium have been used for fluorescent substances in cathode ray tube television sets in analog broadcasting; however, in recent years, large numbers of cathode ray tubes have been put out of use because of the transition to liquid crystal television sets. Products which have rapidly spread, such as secondary batteries and three band fluorescent lamps, can be also easily expected to cause a large amount of waste in the future as used products. Thus, nickel, cobalt and rare earth metals, scarce resources, are treated as waste without recycling of the used products, which is not preferred in terms of resource savings and resource security. Nowadays, the establishment of a method for effectively retrieving valuable metals such as nickel, cobalt and rare earth metals from such used products is strongly demanded.

Incidentally, the above secondary batteries include nickel-hydrogen batteries, lithium-ion batteries and the like, and manganese is used, along with the rare metals nickel and cobalt, as the material for their positive electrode materials. The ratio of inexpensive manganese tends to be increased in the place of expensive cobalt in positive electrode materials for lithium-ion batteries. There have been attempts to retrieve valuable metals from used batteries recently, and as one of these retrieval methods, there is a dry method for retrieving metals in which used batteries are thrown into a furnace and dissolved to separate the metals and slag. In this method, however, manganese moves to the slag and thus only nickel and cobalt are retrieved.

Furthermore, a wet method is also known in which used batteries are dissolved in an acid and the metals are retrieved using a separation method, such as a precipitation method, a solvent extraction method or an electrowinning method. As an example of the precipitation method, a method is known in which the pH of a solution containing nickel, cobalt and manganese is adjusted and a sulfidizing agent is added to obtain sulfide precipitates of nickel and cobalt, and a method is also known in which oxide precipitates of manganese are obtained by adding an oxidizing agent (see Patent Document 1). In this method, however, there are problems in that, for example, coprecipitation occurs, and it is difficult to completely separate nickel, cobalt and manganese.

In addition, when nickel is retrieved as a metal by the electrowinning method, it is known that manganese oxides are precipitated on positive electrode surfaces in a system in which a high concentration of manganese exists and positive electrode deterioration is accelerated. Specific fine colored manganese oxides are floated in electrolyte solutions, which causes, for example, clogging of the filter cloth used it electrowinning as well as contamination of nickel metal due to manganese oxides. Therefore, stable operations are difficult to ensure.

In addition, when nickel is retrieved using the solvent extraction method, an acidic extraction agent is widely used. As described above, however, because a large amount of manganese has been used recently for the positive electrode materials in lithium ion batteries, a high concentration of manganese exists in the electrolyte solutions in the batteries. In the present situation, there is no effective extraction agent to selectively and effectively extract nickel, from such a system.

In addition to the recycling of used batteries, in nickel refining which is carried out at present to produce nickel, cobalt also coexists in the nickel, oxide ores used as a raw material and a large amount of manganese also exists in these ores. Therefore, when nickel is refined, there is a great problem of separating it from cobalt and manganese, Patent Document 1: Japanese Unexamined Parent Application, Publication. No. 2000-234130

Non Patent Document 1: K. Shimojo, H. Naganawa, J. Noro, F. Kubota and M. Goto; Extraction behavior and separation of lanthanides with a diglycol amic acid derivative and a nitrogen-donor ligand; Anal. Sci., 23, 1427-30, 2007 December.

DISCLOSURE OF THE INVENTION

Problems to be Solved by the Invention

An object of the present invention is to provide a method for selectively extracting nickel from an acid solution containing a high concentration of manganese.

As a result of repeated intensive investigation to solve the above problem, the present inventors found that the above object could be achieved by providing a valuable metal extraction agent comprising an amide derivative represented by the following general formula (I), thereby completing the present invention.

Means for Solving the Problems

Specifically, the present invention provides as follows.

(1) The present invention is a nickel extraction method, wherein an acid solution containing manganese and nickel is subjected to solvent extraction by a valuable metal extraction agent comprising an amide derivative represented by the following general formula (I) to extract the nickel from the acid solution:

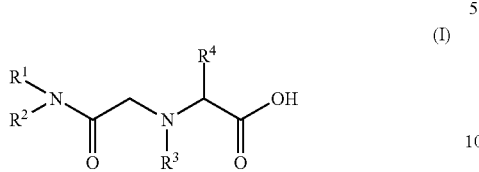

(wherein, $R^1$ and $R^2$ each represent the same or different alkyl groups; the alkyl group can be a straight chain or a branched chain; $R^3$ represents a hydrogen atom or an alkyl group; and $R^4$ represents a hydrogen atom or any group other than an amino group, which is bound to the of carbon as an amino acid).

(2) The present invention is also a nickel extraction method according to (1), wherein the above amide derivative is any one or more of glycinamide derivatives, histidinamide derivatives, lysinamide derivatives, aspartic acid amide derivatives and N-methylglycine derivatives.

(3) The present invention is also the nickel extraction method according to (1) or (2), wherein the acid solution is subjected to the solvent extraction with the pH of the acid, solution adjusted to a range of from 2.3 or more to 5.5 or less.

(4) The present invention is also the nickel extraction method according to (1) or (2), wherein the acid solution further contains cobalt and the acid solution is subjected to the solvent extraction with the pH of the acid solution adjusted to a range of from 2.6 or more to 3.5 or less.

(5) The present invention is also the nickel extraction method according to (1) or (2), wherein the acid solution further contains cobalt and the method comprises the first separation step in which solvent extraction is carried out with the pH of the acid solution adjusted to 3.5 or more and 5.0 or less to separate an organic phase containing nickel and cobalt and an aqueous phase containing manganese, and the second separation step in which the organic phase after the first separation step is mixed with a starting solution for back extraction adjusted to a pH of 2.6 or more and 3.5 or less to separate an organic phase containing nickel and an aqueous phase containing cobalt.

Effects of the Invention

According to the present invention, nickel can be selectively extracted from an acid solution containing a high concentration of manganese. In addition, nickel and cobalt can be selectively extracted from an acid solution containing a high concentration of manganese and containing nickel and cobalt, and nickel and cobalt can each be separated.

PREFERRED MODE FOR CARRYING OUT THE INVENTION

Figure 1:
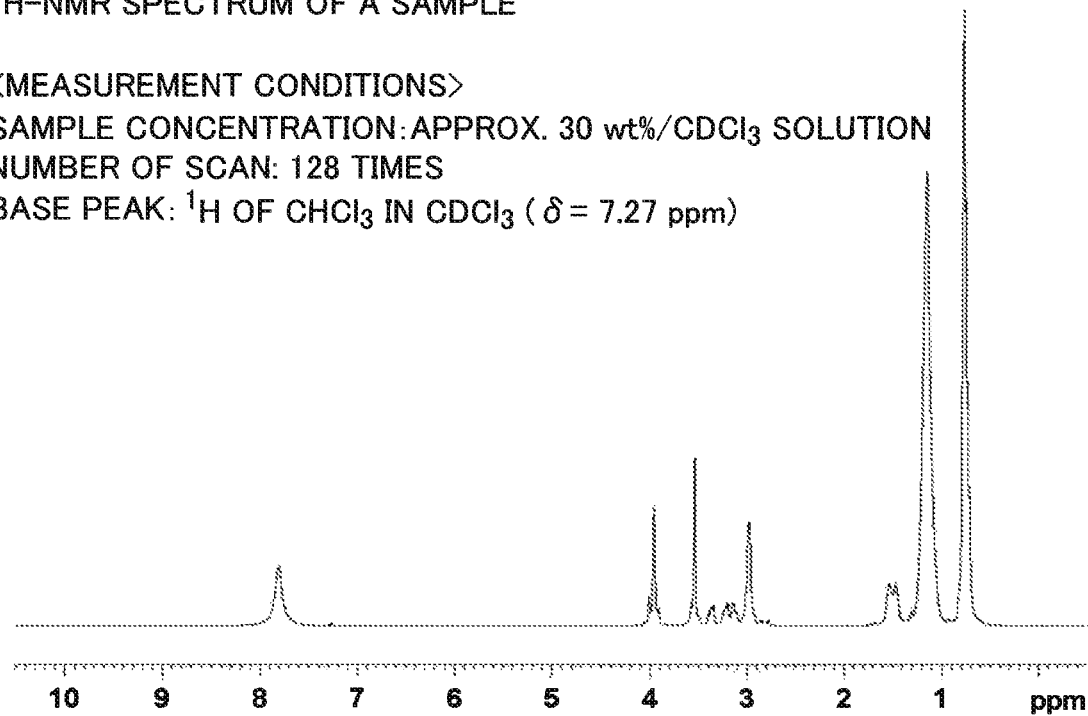
FIG. 1 is a figure showing a $^1$H-NMR spectrum of a glycinamide derivative synthesized in Example.

The specific embodiments of the present invention will now be described in detail. It should be noted, however, that the present invention is not restricted to the following embodiments and can be carried out with proper modification within the scope of the object of the invention.

Nickel Extraction Method

In the nickel extraction method of the present invention, solvent extraction is carried out using a valuable metal extraction agent comprising an amide derivative represented by the following general formula (I) to extract the nickel from an acid solution containing at least manganese and nickel.

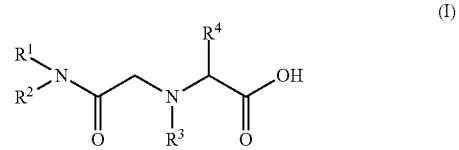

In the formula, $R^1$ and $R^2$ each represent the same or different alkyl groups. The alkyl group can be a straight chain or a branched chain. $R^3$ represents a hydrogen atom or an alkyl group. $R^4$ represents a hydrogen atom or any group other than an amino group, which is bound to the α carbon as an amino acid. In the present invention, lipophilicity is increased by introducing alkyl groups into the amide skeleton, and the compound can be used as an extraction agent.

The above amide derivative is any one or more of glycinamide derivatives, histidinamide derivatives, lysinamide derivatives, aspartic acid amide derivatives and N-methylglycine derivatives. When the amide derivative is a glycinamide derivative, the above glycinamide derivative can be synthesized by the following method. First, a 2-halogenated acetyl halide is added to an alkylamine having a structure represented by NHR$^1$R$^2$ ($R^1$ and $R^2$ are the same as the above substituents $R^1$ and $R^2$), and the hydrogen atom of amine is substituted with a 2-halogenated acetyl by the nucleophilic substitution reaction to obtain a 2-halogenated (N,N-di)alkylacetamide.

Next, the above 2-halogenated (N,N-di)alkylacetamide is added to glycine or an N-alkylglycine derivative, and one of the hydrogen atoms of the glycine or N-alkylglycine derivative is substituted with an (N,N-di)alkylacetamide group by the nucleophilic substitution reaction. A glycine alkylamide derivative can be synthesized by the two-step reactions.

A histidinamide derivative, a lysinamide derivative or an aspartic acid amide derivative can be synthesized by substituting glycine with histidine, lysine or aspartic acid. The extraction behavior of lysine and aspartic acid derivatives is, however, thought to be within the range of the results obtained by using a glycine derivative and a histidinamide derivative according to the complex stability constant of manganese, cobalt and the like, which are targets.

To extract valuable metal ions using an extraction agent synthesized by the above method, with an acid aqueous solution comprising the objective valuable metal ions being adjusted, the acid aqueous solution is added to an organic solution of the above extraction agent, and mixed. Therefore, the objective valuable metal ions can be selectively extracted in the organic phase.

The organic solvent after extraction of the valuable metal ions is collected, and to this, a starting solution for back extraction is added and stirred to separate the objective valuable metal ions by extraction to an organic solvent, which starting solution is adjusted to a pH lower than that of the above acid aqueous solution. The objective valuable metal ions can be further retrieved from the organic solvent in an aqueous solution by back extraction of the objective valuable metal ions. As a solution for back extraction, for example, an aqueous solution in which nitric acid, hydrochloric acid or sulfuric acid is diluted is suitably used. In addition, the objective valuable metal ions can be concentrated by suitably changing the ratio of the organic phase and the aqueous phase.

Any organic solvent can be used, as long as an extraction agent and the extracted species of metals are dissolved with the solvent, and examples thereof include chlorine-based solvents such as chloroform and dichloromethane, aromatic hydrocarbons such as benzene, toluene and xylene, aliphatic hydrocarbons such as hexane, and the like. These organic solvents can be used individually, or two or more organic solvents can be mixed, and alcohols such as 1-octanol can be mixed therewith.

The concentration of the extraction agent can be properly set depending on the types and concentrations of valuable metals. In addition, the equilibrium arrival time varies depending on the types and concentrations of valuable metals and the amounts of extraction agent to be added, and thus the stirring time and extraction temperature can be suitably set depending on the conditions of an acid aqueous solution of valuable metal ions and an organic solution of the extraction agent. The pH of an acid aqueous solution comprising metal ions can be also suitably adjusted depending on the types of valuable metal.

When nickel is efficiently retrieved from an acid aqueous solution containing nickel and manganese, any of the above amino derivatives can be used as an extraction agent. Regarding pH, it is preferred that, with the pH of an acid aqueous solution containing nickel and manganese adjusted to 2.3 or more and 5.5 or less, an organic solution of an extraction agent be added thereto, and it is more preferred that, with the above pH adjusted to 3.2 or more and 5.0 or less, an organic solution of an extraction agent be added thereto. When the pH is less than 2.3, there is a possibility that nickel cannot be sufficiently extracted. When the pH is above 5.5, there is a possibility that not only nickel but also manganese is extracted.

Incidentally, it is also thought that an acid aqueous solution further contains cobalt along with nickel and manganese. In this case, nickel and cobalt can each be separated by adding an organic solution of an extraction agent to the acid solution with the pH adjusted to 2.6 or more and 3.5 or less.

In addition, nickel, cobalt and manganese can be individually separated from an acid solution containing nickel, cobalt and manganese by performing the first separation step in which solvent extraction is carried out with the pH of the acid solution containing nickel, cobalt and manganese adjusted to 3.5 or more and 5.0 or less to separate the organic phase containing nickel and cobalt and an aqueous phase containing manganese, and the second separation step in which the organic phase after the first separation step is mixed with a starting solution for back extraction adjusted to the pH of 2.6 or more and 3.5 or less to separate the organic phase containing nickel and the aqueous phase containing cobalt.

In the first separation step, the pH is preferably adjusted to 4.0 or more and 5.0 or less and more preferably adjusted to 4.5 or more and 5.0 or less to increase the purity and percent yield after separation.

After the above second separation step using a starting solution for back extraction adjusted to the pH of 3.0 or more and 3.5 or less, the purity of nickel and cobalt can be further increased by mixing the organic phase after the second separation step with the second-stage starting solution for back extraction adjusted to the pH of 2.6 or more and 3.0 or less.

The mechanism in which a valuable metal extraction agent comprising an amide derivative represented by the above general formula (I) has an extraction be savior different from that of conventional extraction agents is not accurately grasped, and it is thought that the effects that conventional extraction agents do not have are obtained from the structural characteristics of the extraction agent of the present invention.

EXAMPLES

The present invention will now be described in more detail by way of examples. It should be noted, however, that the present invention is not restricted to these descriptions.

Example

Synthesis of Amide Derivatives

As an example of amide derivatives forming an extraction agent, a glycinamide derivative represented by the above general formula (I) was synthesized, that is, N—[N,N-Bis (2-ethylhexyl)aminocarbonylmethyl]glycine (or also referred to as N,N-di(2-ethylhexyl)acetamide-2-glycine), hereinafter referred to as "D2EHAG"), into which two 2-ethylhexyl groups were introduced.

D2EHAG was synthesized as follows. First, as shown in the following reaction formula (II), 23.1 g (0.1 mol) of commercially available di(2-ethylhexyl)amine and 10.1 g (0.1 mol) of triethylamine were collected. These were dissolved by adding chloroform, and 13.5 g (0.12 mol) of 2-chloroacetyl chloride was then added by drops thereto, followed by washing with 1 mol/l hydrochloric acid once. After this, washing was carried out with ion exchanged water and the chloroform phase was collected.

Next, anhydrous sodium sulfate was added in a suitable amount (approximately 10 to 20 g) for dehydration, followed by filtration to obtain 29.1 g of yellow liquid. When the structure of this yellow liquid (reaction product) was identified using a nuclear magnetic resonance spectrometer (NMR), the above yellow liquid was confirmed to have the structure of 2-chloro-N,N-di(2-ethylhexyl)acetamide (hereinafter referred to as "CDEHAA"). The percent yield of CDEHAA was 90% relative to di(2-ethylhexyl)amine, a raw material.

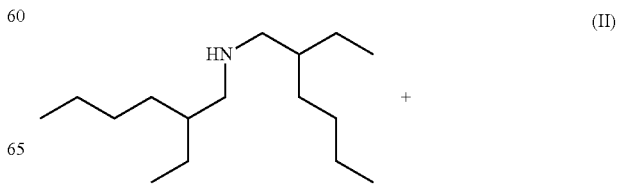

(II)

-continued

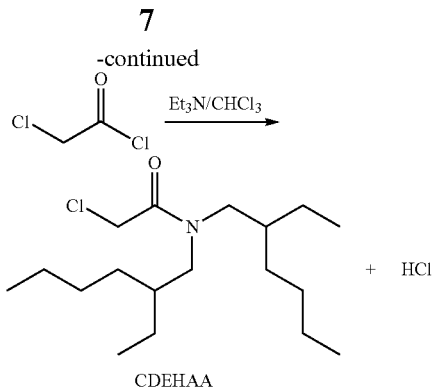

CDEHAA

Next, as shown in the following reaction formula (III), 8.0 g (0.2 mol) of sodium hydroxide was dissolved by adding methanol, and 15.01 g (0.2 mol) of glycine was further added thereto. While stirring the obtained solution, 12.72 g (0.04 mol) of the above CDEHAA was slowly added by drops thereto and stirred. After completion of stirring, the solvent in the reaction liquid was distilled off, and the residue was dissolved by adding chloroform. To this solution, 1 mol/l sulphuric acid was added for acidification, followed by washing with ion exchanged water, and the chloroform phase was collected.

Figure 2:
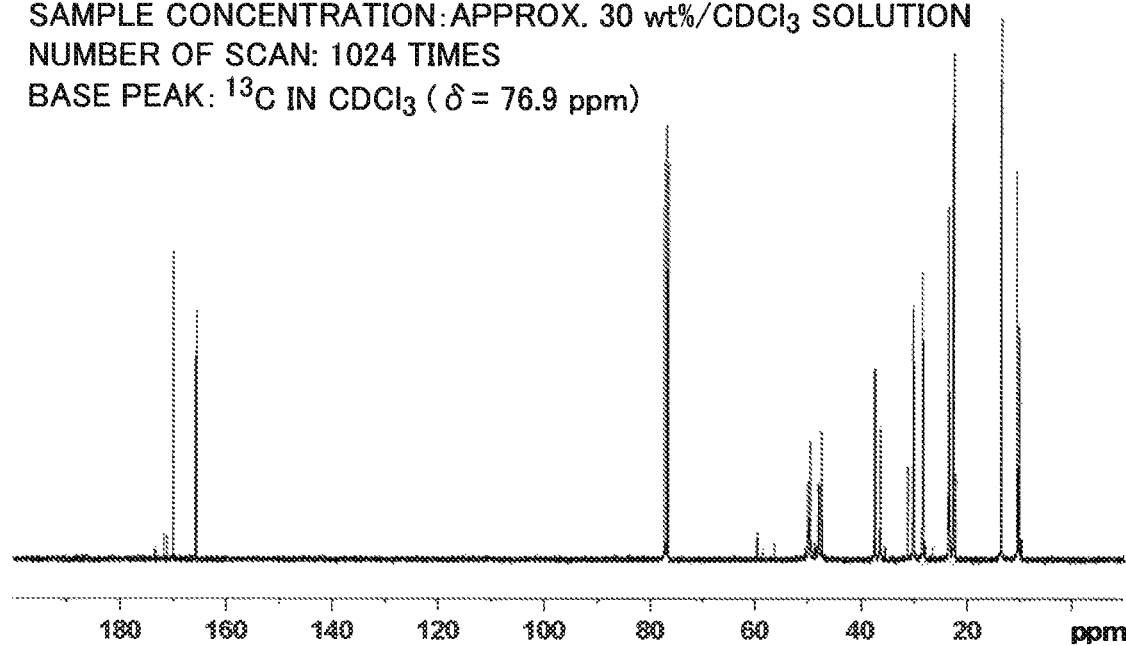
FIG. 2 is a figure showing a $^{13}$C-NMR spectrum of a glycinamide derivative synthesized in Example.

To this chloroform phase, anhydrous magnesium sulphate was added in a suitable amount for dehydration, followed by filtration. The solvent was removed under reduced pressure again to obtain 12.5 g of yellow paste. The percent yield based on the amount of the above CDEHAA was 87%. When the structure of the yellow paste was identified by NMR and elemental analysis, the paste was confirmed to have the structure of D2EHAG as shown in FIG. 1 and FIG. 2. The above steps were carried out to obtain a valuable metal extraction agent of Example.

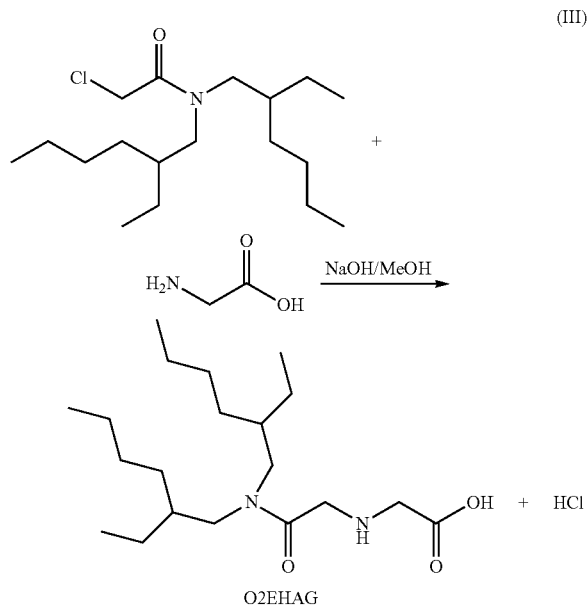

O2EHAG

Extraction of Nickel

Nickel was extracted and separated using the valuable metal extraction agent of Example.

Several types of acid solution of sulfuric acid containing nickel, cobalt and manganese each in an amount of $1 \times 10^{-4}$ mol/l with their pH being adjusted to 2.5 to 7.5, and an equal volume of an n-dodecane solution comprising 0.01 mol/l of a valuable metal extraction agent were combined in test tubes, and the test tubes were put into a constant temperature oven at 25° C. and shaken for 24 hours. At this time, the pH of the sulfuric acid solution was adjusted using 0.1 mol/l sulfuric acid, ammonium sulfate and ammonia.

Figure 3:
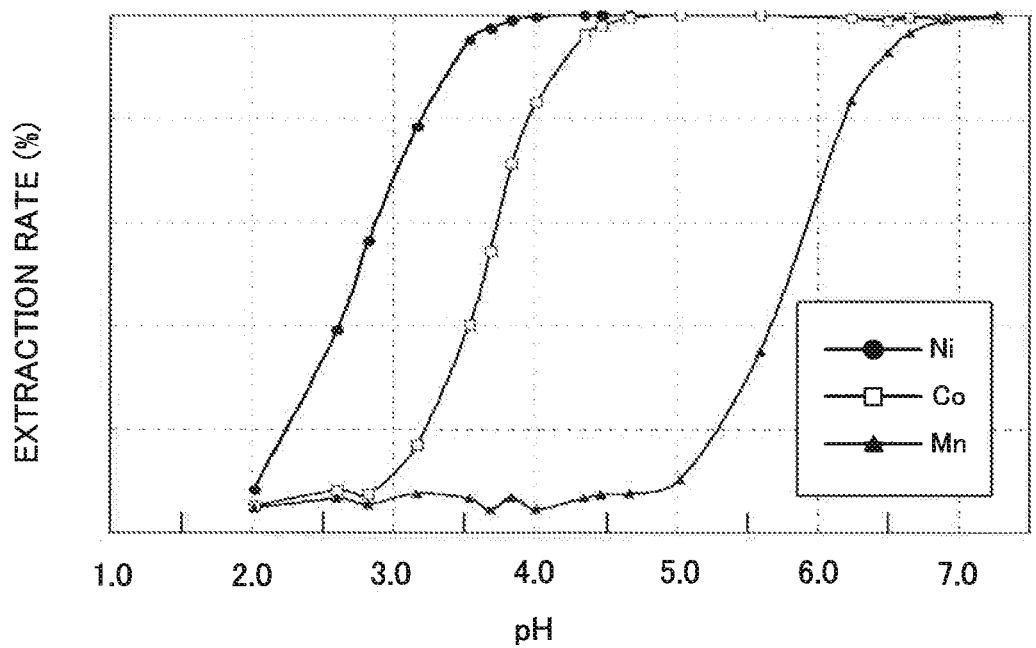
FIG. 3 shows a relationship between the pH of an acid solution containing nickel, cobalt and manganese and the extraction rates thereof when using the valuable metal extraction agent of Example.

After shaking, the aqueous phase was collected, and the cobalt concentration and the manganese concentration were measured using inductively coupled plasma-atomic emission spectroscopy (ICP-AES). The organic phase was subjected to back extraction using 1 mol/l sulfuric acid. The nickel concentration, the cobalt concentration and the manganese concentration in the back extraction phase were measured using ICP-AES. From these measurement results, the extraction rates of nickel, cobalt and manganese were defined as the amount of material in the organic phase/(the amount of material in the organic phase+the amount of material in the aqueous phase) and measured. The results of the use of the valuable metal extraction agent of Example are shown in FIG. 3. In FIG. 3, the abscissa is the pH of the acid solution of sulfuric acid, and the ordinate is the extraction rate (unit: %) of nickel, cobalt or manganese. In the graph, the circle indicates the extraction rate of nickel, the square indicates the extraction rate of cobalt, and the triangle indicates the extraction rate of manganese.

Comparative Example

Figure 4:
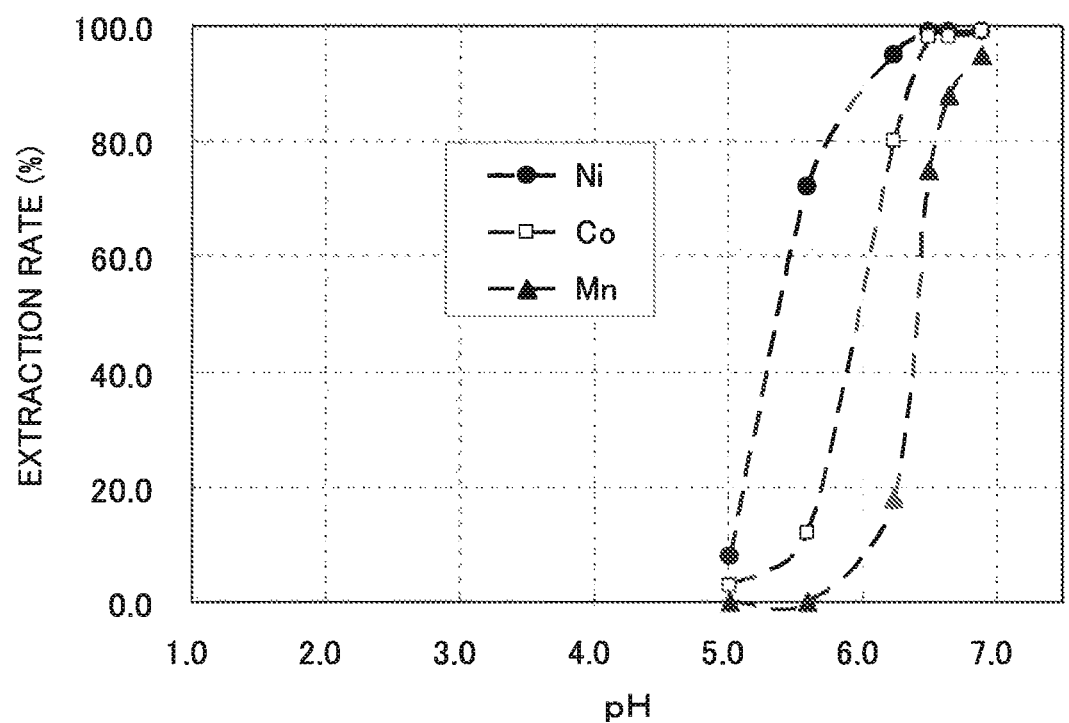
FIG. 4 shows a relationship between the pH of an acid solution containing nickel, cobalt and manganese and the extraction rates thereof when using the valuable metal extraction agent of Comparative Example.

Nickel was extracted by the same method as in Example except that a commercial carboxylic acid-based nickel extraction agent (Product name: VA-10, neodecanoic acid, manufactured by Hexion Specialty Chemicals Japan) was used as a valuable metal extraction agent in place of D2EHAG, the pH of the acid solution of sulfuric acid was adjusted to 4.0 to 7.5, and the concentration of the n-dodecane solution comprising the valuable metal extraction agent was changed to 0.1 mol/l, which is ten times the concentration in Example. The results are shown in FIG. 4. In FIG. 4, the abscissa is the pH of the acid solution of sulfuric acid, and the ordinate is the extraction rate (unit: %) of nickel, cobalt or manganese. In the graph, the circle indicates the extraction rate of nickel, the square indicates the extraction rate of cobalt, and the triangle indicates the extraction rate of manganese.

Consideration

It was recognized that by using the valuable metal extraction agent of Example, nickel and cobalt could be extracted at an extraction rate of at least above 20% at the pH of 2.3 or more and manganese could be extracted only at an extraction rate of 30% or less at pH 5.5 or less (FIG. 3). It was also recognized that nickel could be extracted at an extraction rate of above 80% and manganese was hardly extracted in a pH range of 3.2 or more to 5.0 or less (FIG. 3). Furthermore, nickel is extracted at an extraction rate of 40% or more and simultaneously cobalt is extracted only at an extraction rate of less than 40% in a pH range of 2.6 or more to 3.5 or less, and it is thus found that nickel and cobalt can also be separated.

Meanwhile, it was recognized that by using the valuable metal extraction agent of Comparative Example 1, nickel could be extracted only at an extraction rate of less than 20% even when the concentration of the extraction agent was ten times that in Example (FIG. 4).

The invention claimed is:

1. A nickel extraction method, wherein an acid solution containing manganese and nickel is subjected to solvent extraction with an extraction agent comprising an amide derivative represented by the formula:

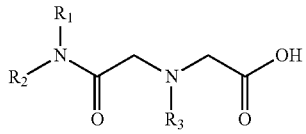

to extract the nickel from the acid solution;
wherein, $R^1$ and $R^2$ are the same or different and each represent a straight or branched alkyl group; and
$R^3$ represents a hydrogen atom or an alkyl group.

2. The nickel extraction method according to claim 1, wherein the acid solution is subjected to the solvent extraction with the pH of the acid solution adjusted to a range of 2.3 to 5.5.

3. The nickel extraction method according to claim 1, wherein the acid solution further contains cobalt and the acid solution is subjected to the solvent extraction with the pH of the acid solution adjusted to a range of from 2.6 to 3.5.

4. The nickel extraction method according to claim 1, wherein the acid solution further contains cobalt and the method comprises:
the first separation step in which solvent extraction is carried out with the pH of the acid solution adjusted to 3.5 to 5.0 to separate an organic phase containing nickel and cobalt and an aqueous phase containing manganese, and
the second separation step in which the organic phase after the first separation step is mixed with a starting solution for back extraction adjusted to a pH of 2.6 to 3.5 to separate an organic phase containing nickel and an aqueous phase containing cobalt.

* * * * *